No. 869,788. PATENTED OCT. 29, 1907.
F. E. KINSMAN.
INSULATED JOINT.
APPLICATION FILED MAR. 1, 1905.
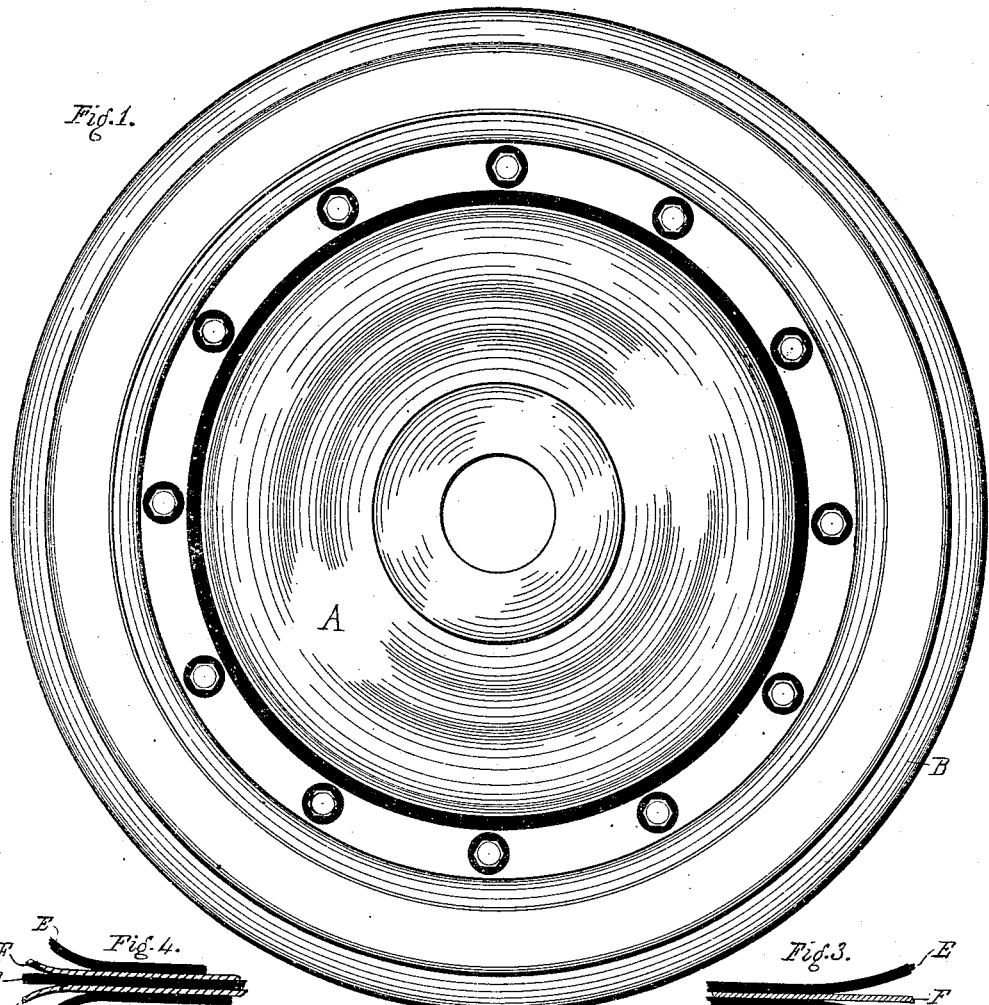
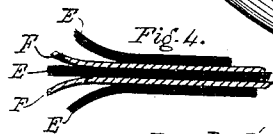
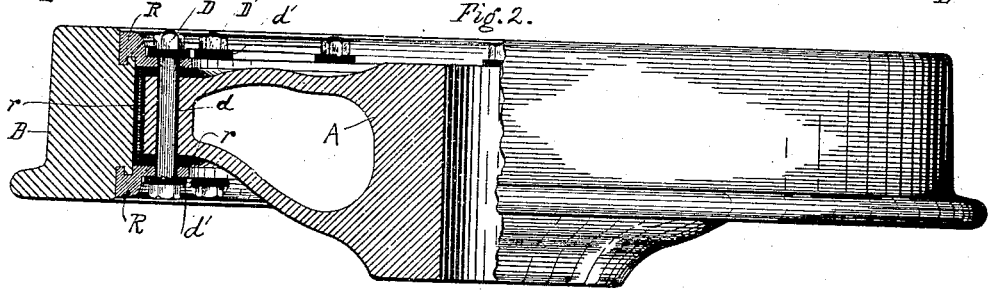
Witnesses
E. W. Collins
Walter Abb
Inventor
Frank E. Kinsman
By his Attorneys
Howson and Howson
THE NORRIS PETERS CO., WASHINGTON, D. C.

UNITED STATES PATENT OFFICE.

FRANK E. KINSMAN, OF PLAINFIELD, NEW JERSEY.

INSULATED JOINT

No. 869,788.  Specification of Letters Patent.  Patented Oct. 29, 1907.

Application filed March 1, 1905. Serial No. 247,981.

*To all whom it may concern:*

Be it known that I, FRANK E. KINSMAN, a citizen of the United States of America, and a resident of the city of Plainfield, Union county, State of New Jersey, have invented an Improved Insulated Joint, of which the following is a specification.

In various applications in electrical service where two metallic bodies have to be electrically insulated from each other by the interposition of a layer or layers of non-conducting material, such as hard fiber for example, a chip of metal may get in or be left in between the insulating layer and one of the metallic faces, and may gradually work its way through the insulation to the other metallic part and form a short circuit, especially where the appliance in which the insulation is employed is subject to mechanical blows, motion, pressure, or like hard service. For example, in electric railway service it is sometimes necessary to insulate the rails from the roadway or the traction wheels from the metal of the bodies of the cars. My invention is designed to provide a construction which will prevent the formation of a short circuit through the insulation in these railway and other constructions.

In the accompanying drawings I have, by way of example, shown my invention in its application to a car wheel, where I secure the desired effect in insulating the rim of the wheel from its body.

Figure 1 is a side view of a known construction of car wheel; Fig. 2 is a transverse section through such wheel, provided with my improvement; Fig. 3 is an enlarged sectional view of the insulation and protective plates of my invention; and Fig. 4 is a similar view of a modification.

A is the body and B is the rim of the car wheel, held to the body by the clamping rings R R and the bolts and nuts D, D¹. Between the periphery of the body A of the wheel and the inner face of the rim B, I provide a layer or layers of insulating material, and similar layers or rings r of insulating material are placed between the inner faces of the clamping rings R R and the adjacent edges of the car wheel body. Over the securing bolts are placed sleeves d of insulating material and under the bolt heads and nuts are insulating washers d¹ d¹.

In putting the parts together, a chip or small piece of metal is liable to get in between the periphery of the wheel body and the insulation, or between the latter and the rim B, and in the running of the cars, such a particle of metal would be apt to cut or work its way through the sheet of insulation and establish a short circuit, with possibilities of dangerous and serious results. To obviate this trouble in car wheels and other appliances I have provided a mechanically impenetrable layer of metal, or the like, within the insulation sheets. For this purpose I make the insulation which is to go between the wheel and its rim in a number of layers. In Figs. 2 and 3 I have shown two such layers E E, and between these two layers I place a layer F of steel or the like impenetrable material, which will effectually stop a loose chip of metal or the like from penetrating or working its way through to make a short circuit from the rim to the wheel body. If desired, there may be more than one layer F of steel or the like. Thus in Fig. 4 I have shown two sheets F F alternated with three layers E, E of insulating material, so that if by any chance, a piece of metal should work its way, say from the rim side through the adjacent insulating sheet E to the first metal diaphragm F, and another at some point should make a connection between the wheel body and the next metal diaphragm F, there would still be the intermediate layer of insulating material to prevent a short circuit from the rim to the wheel. In like manner my protected insulation layer may be employed for insulating railway rails and joints in other appliances or apparatus, as will be readily understood.

I claim as my invention

1. An insulated wheel for use in electric traction, having one or more mechanically impenetrable layers within the insulation between the wheel body and its rim, as and for the purpose set forth.

2. An insulated wheel for use in electric traction, having a body and separate rim with insulation between them and an impenetrable layer within said insulation.

3. An insulated wheel for use in electric traction, having a body, a separate rim, side clamping rings, and securing bolts with insulation between the body and rim and clamping rings impenetrable layers within said insulation and insulating sleeves on bolts.

In testimony whereof I have signed my name to this specification, in the presence of two subscribing witnesses.

FRANK E. KINSMAN.

Witnesses:
FRANK A. BUTLER,
HUBERT HOWSON.